Sept. 12, 1950 E. J. DREISBACH 2,522,214
ROLL FILM CAMERA HAVING COMBINED FILM-ADVANCING
AND SHUTTER-OPERATING MEANS
Filed April 3, 1946 2 Sheets-Sheet 1
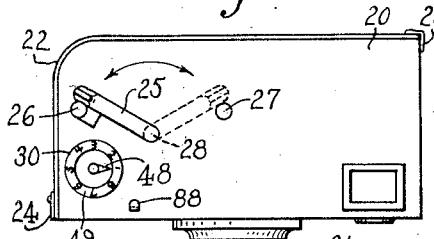
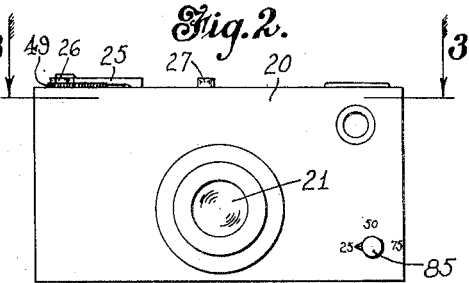
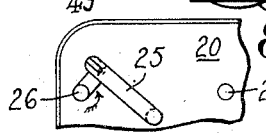
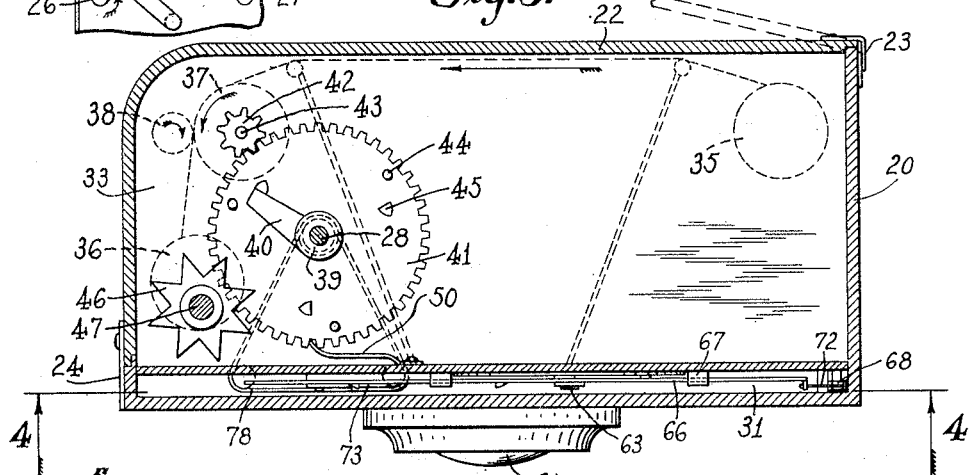
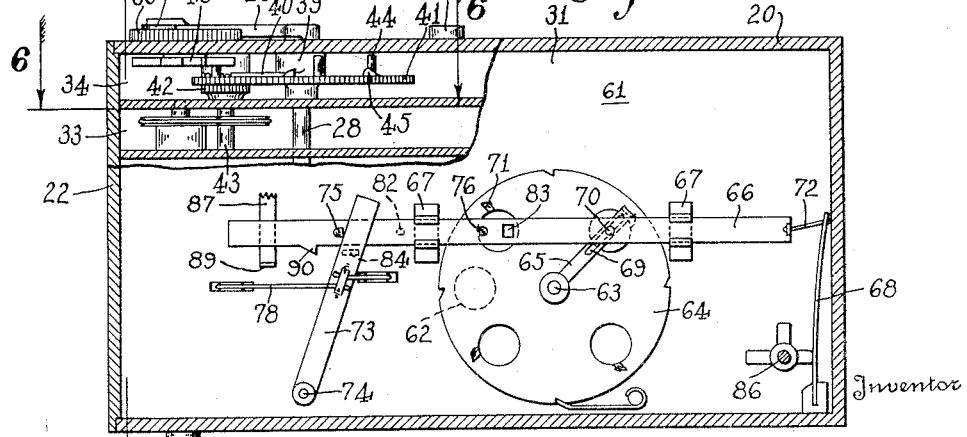
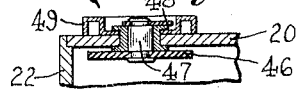
Inventor
Edwin J. Dreisbach
By Rockwell & Bartholow
Attorneys Sept. 12, 1950 E. J. DREISBACH 2,522,214
ROLL FILM CAMERA HAVING COMBINED FILM-ADVANCING
AND SHUTTER-OPERATING MEANS
Filed April 3, 1946 2 Sheets-Sheet 2
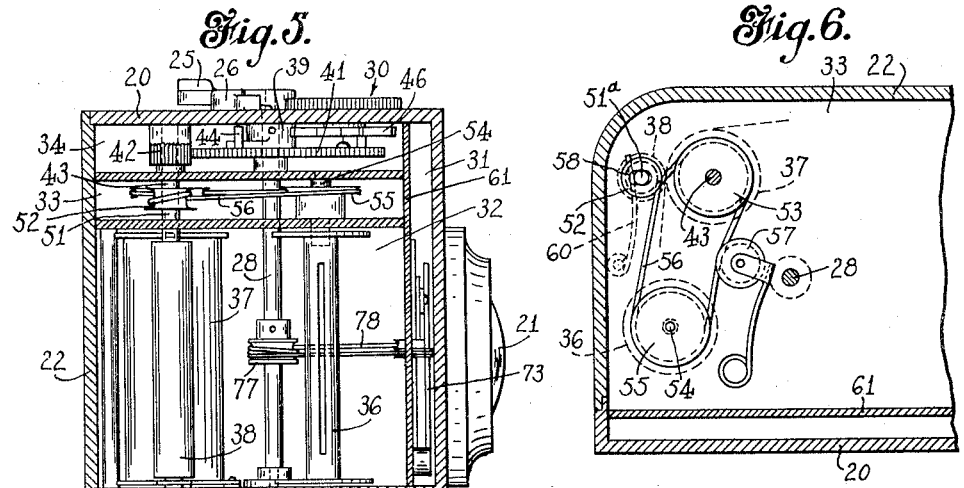
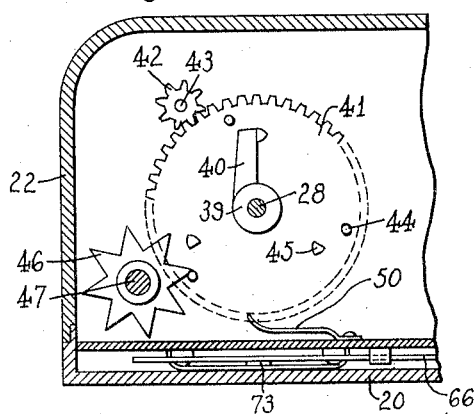
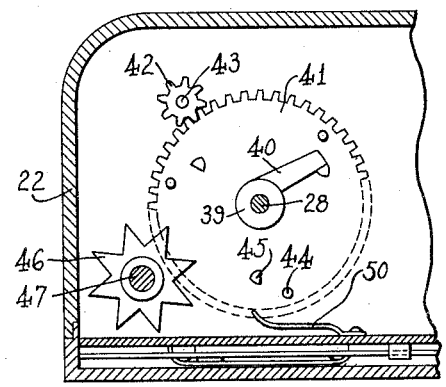
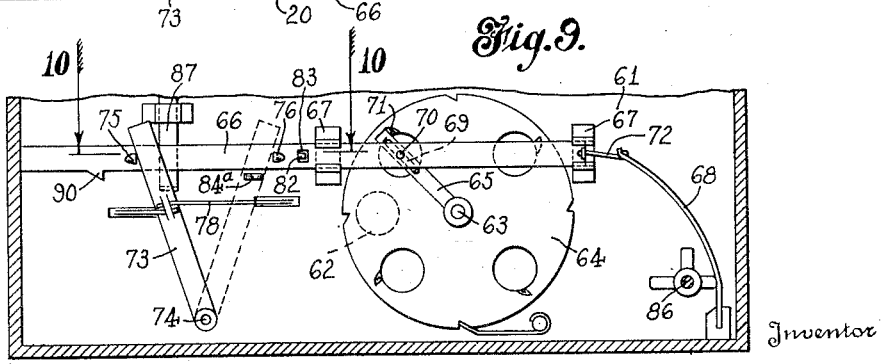
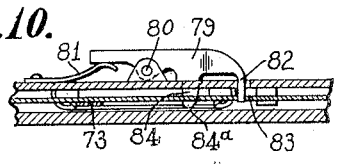
Inventor
Edwin J. Dreisbach
By Rockwell & Bartholow
Attorneys Patented Sept. 12, 1950

2,522,214

UNITED STATES PATENT OFFICE 2,522,214

ROLL FILM CAMERA HAVING COMBINED FILM-ADVANCING AND SHUTTER-OPERATING MEANS

Edwin J. Dreisbach, New Haven, Conn.

Application April 3, 1946, Serial No. 659,307

8 Claims. (Cl. 95—31)

This invention relates to photographic cameras, and more particularly to those of the type using film on a spool, the film being unwound step by step through hand manipulation for taking successive pictures.

One of the objects of the invention is to simplify the hand manipulation of the camera in using the same after the camera has been loaded with film.

Another object is to provide a manipulating or control member of simple form.

Another object is to place the transporting or advance of the film and the operation of the shutter under the control of a conveniently operable member such as a swinging lever or arm that can be conveniently and quickly manipulated for the purposes in view.

In the accompanying drawings:

Fig. 1 is a plan view of a camera embodying my improvements;

Fig. 1^A is a detail showing the manipulating arm of Fig. 1 in a different position;

Fig. 2 is a front elevation of the camera;

Fig. 3 is an enlarged section on line 3—3 of Fig. 2;

Fig. 4 is a section on line 4—4 of Fig. 3, certain parts being broken away, the shutter being in the position which it occupies after an exposure;

Fig. 5 is a section on line 5—5 of Fig. 4;

Fig. 6 is a section on line 6—6 of Fig. 4;

Figs. 7 and 8 are sectional views illustrating the operation of the device;

Fig. 9 is a view somewhat similar to Fig. 4, showing the shutter in the cocked position;

Fig. 10 is a section on line 10—10 of Fig. 9; and

Fig. 11 is a detail sectional view of the register mechanism used in connection with the film-transporting means.

In the embodiment selected for illustration, the camera is of the box type, having a lens-carrying body within which are mounted the shutter, the film spools, and the means for transporting the film, said means having an external manipulating member in the form of a swinging arm, which in this instance is located in accessible position at the top of the box. This arm is also connected with the shutter in the manner hereinafter described. The box has a movable cover extending along the rear and along one side, the cover being hinged or mounted in any suitable manner so that the box can be loaded with film and then closed, after which, for taking successive pictures, it is merely necessary to operate the manipulating arm by swinging it in opposite directions through an arc of limited extent. In this instance the camera is additionally supplied with a movable registering mechanism visible at the top of the box, showing the position of the film within the box, in other words, its position at any particular time with reference to the course which it follows in being wound on the take-up spool. The shutter is arranged in a compartment located adjacent the front wall of the box. Behind this compartment is a main compartment of the box containing the film spools, and above the main compartment are shallow compartments containing elements of the mechanism as hereinafter described.

In the drawings, the box is indicated at 20, the same being provided at the front with the lens 21. The cover 22, arranged in the manner previously mentioned, is hinged to the body by hinge 23, and is adapted to be held in the closed position by a latch 24. Accessible at the top of the box is the manipulating arm 25, which arm cooperates with a stop 26 at one side and a stop 27 at the other side, said stops limiting the arcuate movement of the arm in this particular instance to approximately 120°, although this is by way of example only. The arm 25 is rigidly mounted on the upper extremity of a rock shaft 28, traversing the box in a vertical direction (Fig. 5), and having suitable bearings within the box. Accessible at the lower face of the box is a projecting rotary member 29 of any appropriate kind that may be used, if desired, for manipulating the take-up spool for the film. In this particular case there is placed in association with the upper wall of the box a registering mechanism, generally indicated at 30, having a dial and a rotary pointer, as hereinafter described, showing the extent to which the film is advanced from the starting position.

Referring particularly to Fig. 5, the front compartment for the shutter is indicated at 31, and rearwardly of this is the main box compartment 32, and above compartment 32 the shallow compartments 33 and 34, respectively. Within the main compartment 32 is the film supply spool 35, the same being located near a rear corner of the box, and also located in this compartment is the film take-up spool 36, which, with reference to spool 35, is near a diagonally located corner. Also in compartment 32 are two rollers for feeding the film between them, one of these being a large roller 37 and the other a small roller 38. The path of the film in being advanced is indicated by the arrows in Fig. 3. The advance is caused by the swinging movement of arm 25, which causes turning of rock shaft 28.

Rock shaft 28 has pinned to it below the top wall of the box a hub 39 carrying a rigid arm 40. Immediately below the arm 40 a large gear 41 is rotatably mounted about shaft 28, said gear meshing with a pinion 42. The pinion 42 is wider than the gear, and it is rigidly fixed upon a shaft 43 that carries the feed roller 37 previously mentioned. Gear 41 and pinion 42 are located in compartment 34. The gear 41 is shown as provided with three rigid upstanding pins 44 spaced at intervals around the gear, and the upper face of the gear is also furnished with three lugs 45, said lugs being provided with side faces that are adapted to be engaged by the extremity of arm 40 for rotating the gear. The lugs 45 have inclined upper faces, and, when the arm 40 is rotated in a counterclockwise direction with reference to Fig. 3, it can slide over any lug located in its path. The pins 44 act successively on a star wheel 46 located above the gear 41, said star wheel being fixed on a short arbor 47 that is rotatable in the top wall of the box. The arbor 47 carries at its upper end a pointer 48 that is visible at the top of the box and is arranged within a register member in the form of a ring 49, the upper surface of which, in this instance, carries the dial numbers from 1 to 8, inclusive. The ring 49 is frictionally engaged with the box wall in a suitable manner so that it can be turned manually for setting. The pins 44 engage the star wheel to turn the pointer arbor with reference to the dial. The teeth of gear 41 cooperate with a suitable detent 50, in the manner indicated in Fig. 3, which detent serves to prevent a retrograde movement of the gear wheel, or, in other words, counterclockwise movement with respect to Fig. 3.

The small feed roller 38 is mounted on a shaft 51 mounted in adjacent walls of the box structure and having its upper end 51a projected into the compartment 33, where this end carries a pulley 52. Within compartment 33 the shaft 43 of feed roller 37 carries a pulley 53. Within the compartment 33 there is also disposed a stub shaft 54 that has detachable interlocking engagement with the take-up spool 36. The stub shaft carries a pulley 55 in compartment 33, and projecting into compartment 32 is a squared-off part adapted to engage and drive the take-up spool. A rope or belt 56 is reeved around the pulleys 52, 53 and 55 in the manner shown in Fig. 6. A spring-pressed idler roller 57 maintains proper tension on the belt. The small roller 38 is movably mounted with respect to its cooperating roller 37, the small roller being movable toward and away from the large roller, and in the embodiment shown the upper and lower ends (Fig. 5) of the shaft 51 are mounted in slots 58 and 59, respectively, in the bottom and top walls of compartment 32. A small spring 60 adjacent the lower end of the small roller (Fig. 5) presses it toward the large roller.

As previously stated, the shutter is arranged in the compartment 31. This compartment has a rear wall 61 provided with a lens opening 62, and mounted on wall 61 at the front thereof by means of an arbor 63 is a shutter disk 64, which in this instance is provided with four circumferentially spaced apertures movable past opening 62 as the disk is turned on its axis. The disk is turned by means of an arm 65 pivoted on arbor 63, and by an actuating slide 66. The slide 66 has lateral sliding movement in suitable guides 67 on the wall 61, and the slide has a spring 68 acting upon it so that the slide can be cocked in the manner hereinafter described. The arm 65 has a slotted portion 69 adjacent its free end, engaging a small pin 70 carried by the slide, and the free end of the arm 65 is adapted to have successive engagement with small projections 71 located adjacent the respective disk apertures. The projections 71 are of a structure such that each one has a shoulder at one side adapted to be engaged by the arm 65 to move the disk, although, on the other hand, the projection has a sloping upper surface over which arm 65 can be moved in a counterclockwise direction (Fig. 4). The spring 68 is preferably a spring-wire spring fastened at its lower end to the floor of the compartment and having a link connection 72 at its upper end with the right-hand end of the slide (Fig. 4). Cooperating with the opposite end of the slide is an actuator which in this instance comprises a swinging arm 73 pivoted on wall 61 at 74, and having an upper end located between projections 75 and 76 on the slide.

The swinging arm 73 has connections with the film-transport mechanism, such that it can be swung in opposite directions by actuation of such mechanism. In the form shown the rock shaft 28 has fixed to it a pulley 77, and this pulley has fixed to its surface the middle portion of a string 78 that actuates arm 73. The end portions of the string are led through slots in wall 61, so that the end portions pass to the arm 73 from opposite sides, as shown in Fig. 4. The end portions are also guided over small rollers suitably attached to the wall 61, as appears from Fig. 3. Fig. 4 shows how the extremities of the string are attached to arm 73. Depending upon the direction of rotation of shaft 28, the arm 73 will swing to the right or to the left. Its upper end is placed between the projections 75 and 76, and is adapted to co-act with them in the manner which will hereinafter appear.

Mounted at the inner side of wall 61 is a member 79 pivoted at 80 and acted upon by a spring 81. The member 79 is in the nature of a lever having at the free end a projecting finger 82 extending through an aperture in wall 61 and adapted to engage at its extremity a small opening 83 in the slide 66. Between the finger 82 and the pivot 80, the lever 79 carries a cam-like projection 84 that operates in a cut-out portion of wall 61 and has its end portion 84a disposed below the slide 66, as shown in Fig. 9. Arm 73 is adapted to engage cam projection 84 to thereby release the slide 66 by withdrawing the finger 82 from the opening 83. The slide 66 can then be shifted.

Fig. 9 shows the shutter in the cocked position, the slide 66 being in its left-hand position and the spring 68 being energized, and the lever 79 holding the slide in the cocked position. The rapidity of the shutter action can be varied from a knob 85 mounted in the front wall of the box and having a shaft 86 upon which are mounted projecting arms of a different length that are adapted to engage the spring for energizing the same to different degrees.

The manipulating arm 25 is moved toward the right (Fig. 1) for feeding film, and then to the left (Fig. 1) for releasing the shutter. As the release occurs, the arm comes into contact with the stop 26. In order that the arm can, when desired, be held out of the shutter-releasing position, the stop 26 is adjustable, and, in the case shown, this stop has a pivotal mounting on the box wall and can be swung to the position shown in Fig. 1A, where it will block the arm and prevent it reaching the shutter-releasing position.

In loading the camera with film, the new spool 35 will be placed in position as usual, and the paper threaded between the rolls 38 and 37, and thence to the take-up spool 36, the latter being manipulated by the knob 29. It will be advisable to provide the film-carrying paper with an indicating line or other suitable indication adapted to be moved up to the bite between the feed rolls 38 and 37. In placing the paper between the rolls 38 and 37, 38 will be held manually out of engagement with 37 so that in this operation there will be no turning of these rolls. The box is then closed, and the film is moved into position for the first exposure, making use of the feed rolls 38 and 37 and the other parts of the feed mechanism previously described. Arm 25 is moved clockwise from the left-hand position shown in Fig. 1 to the position shown in dotted lines. In this operation arm 40 will swing through 120° in engagement with one of the lugs 45, moving gear 41 and pinion 42. As the manipulating arm is moved in this manner, the shutter is cocked through the connections previously described, the shutter-moving arm 73 being moved to the left-hand position (Fig. 9), and the shutter spring being energized. The camera is thus set for taking a picture, and all that is required for taking the picture after the camera has been pointed at the object is to swing the manipulating arm counterclockwise to the position shown in full lines in Fig. 1. This is a movement which can be performed very quickly and conveniently, and very quick action in taking a picture can be obtained. At the instant when the shutter is actuated, the arm 40 is moved to a position where it will be in actuating engagement with one of the lugs 45.

After the picture has been taken, the arm is moved clockwise again (Fig. 1), and upon this operation or actuation, the pin 44 which is adjacent the star wheel 46 (Fig. 7) is moved to engage and turn the star wheel, which is thereby shifted to move the pointer 48 to the numeral "2" on the scale, thus indicating the position for the second exposure. The operations above described will then be repeated as further pictures are taken.

For use in taking time exposures, a slide 87 may be used, the same having a manipulating end 88 projecting from the box. The slide has an extremity 89 adapted to cooperate with a projection 90 on the shutter slide 66 in holding the shutter in open position.

It will be understood from the foregoing that the hand manipulation of the camera in using it after it has been loaded with film is greatly simplified, as operations at this time are under the control of the single manipulating member, such as the swinging arm, which is operably connected to the film-feeding means, the film-position register, and the shutter. Movement of the arm in one direction cocks the shutter and movement in the opposite direction releases it. As the manipulating arm is moved to the shutter-cocking position, the film-feed mechanism is shifted to feed the film into position for the picture to be taken. The shutter being connected to the film-feeding mechanism, the objection of double exposure of a portion of the film is overcome.

In taking pictures with ordinary cameras there is considerable delay in connection with the feeding of the film, and there is also considerable delay in setting the shutter for operation. Where objects of great interest are presented in quick succession, the delay incident to these manipulations is a great drawback. It will be apparent that by the present invention, where the only manipulation required under these conditions is the swinging of the manipulation arm, first in one direction and then in the opposite direction, operation is speeded up to a very notable degree.

It will be manifest that in the structure herein disclosed a rock shaft having an exteriorly accessible swinging arm is arranged to drive, through an interior arm carried by said shaft, a gear revoluble about the shaft, said gear meshing with a gear on one of a pair of friction feed rolls for the film, so that by manipulation of the external arm the film can be advanced for the next exposure, the first gear also being adapted to actuate a suitable external register or indicator, the rock shaft also being connected by a flexible element to a laterally swinging arm which, when moved in one direction, cocks the shutter, said last-named arm being adapted to operate a shutter slide which can be latched in the cocked position of the shutter through a pivoted latch, said latch holding the shutter in the cocked position and being releasable by said last-mentioned arm upon movement of the external or manipulating arm into a predetermined position. It will also be evident that in this embodiment the large feed roller has a rope-and-pulley connection with the small feed roller for rotating it, and a rope-and-pulley connection with the take-up spool stub shaft for rotating it in a feeding direction. It will be noted that the shutter disk is rotated stepwise in one direction for taking successive pictures through the action of the arm 65, which is in turn actuated by the slide 66, retrograde movement of the disk being prevented by a suitable pawl member such as the spring shown in the drawing.

The disclosure in the drawings is by way of example only, and it will be apparent that various modifications and changes in the organization of parts and in the details may be made without departure from the principles of the invention or the scope of the claims.

What I claim is:

1. In a camera, the combination of a box equipped with a lens and a shutter and with provisions for mounting a film supply spool and a take-up spool, the shutter comprising a disk adapted to be turned progressively and having successively acting apertures therein and also comprising a disk-rotating means including a slide acted on by a spring and adapted for cocking, a latching means engageable with the slide and adapted to hold it in the latched or cocked position, a pair of rollers between which the film is frictionally gripped as it passes from the supply spool to the take-up spool, a rock shaft mounted in the box, a pivoted arm operable by connections from said rock shaft and adapted to shift said slide and cock the shutter as said arm moves in one direction and to release said latching means as said arm moves in the opposite direction, a gear revoluble about said rock shaft within the box connected to one of said feed rollers to rotate the same, an arm rigid with said rock shaft within the box adapted when said shaft is turned to rotate said gear in a direction to feed film, a register mechanism visible at the exterior of the box operable from said gear, and a manipulating arm rigid with said rock shaft and accessible at the exterior of the box, said manipulating arm being swingable through a predetermined arc in opposite directions and adapted on being traversed in one direction to feed film to the required extent for the next exposure and cock the shutter and on traverse in the opposite direction to release the cocked shutter for taking the picture.

2. In a camera, the combination of a box equipped with a lens and a shutter and with provisions for mounting a film-supply spool and a take-up spool, the shutter comprising a disk adapted to be turned progressively and having successively acting apertures therein and also comprising a disk-rotating spring-pressed slide adapted to be cocked and a latching means for holding the slide in the cocked position, a pair of rollers between which the film is frictionally gripped as it passes from the supply spool to the take-up spool, a rock shaft mounted in the box, an arm operable from said rock shaft and adapted to shift said shutter slide and cock the shutter as the arm moves in one direction and to release said latching means as the arm moves in the opposite direction, means operable from said rock shaft for turning the feed rollers, and a manipulating arm rigid with said rock shaft and accessible at the exterior of the box, said manipulating arm being swingable through a predetermined arc in opposite directions and adapted on being traversed in one direction to feed film to the required extent for the next exposure and cock the shutter and on traverse in the opposite direction to release the cocked shutter for taking the picture.

3. In a camera, the combination of a box equipped with a lens and a shutter and with provisions for mounting a film-supply spool and a take-up spool, the shutter comprising a movable spring-pressed element adapted to be cocked and having a latch in connection therewith for holding it in the cocked position, a pair of rollers between which the film is frictionally gripped as it passes from the supply spool to the take-up spool, a rock shaft mounted in the box, means operably connecting said rock shaft with the shutter so that the shutter is cocked and released, a gear revoluble about said rock shaft within the box connected to one of said feed rollers to rotate the same, an arm rigid with said rock shaft within the box adapted to rotate said gear in a direction to feed film, and a manipulating arm rigid with the rock shaft and accessible at the exterior of the box, said manipulating arm being swingable in opposite directions and adapted on being moved in one direction to feed film to the required extent for the next exposure and cock the shutter and on being moved in the opposite direction to release the cocked shutter for taking the picture.

4. In a camera, an external manipulating arm swingable in opposite directions in a predetermined arc, an internal operating member connected to said arm, a cockable shutter operatively connected to said member, a film-feeding means operably connected to said member, said arm when traversed in one direction being adapted to feed film and on being traversed in the opposite direction effecting the release of the shutter, and limiting stops on the camera box between which said arm operates arranged to limit the swing of the arm in the respective directions, one of said stops being adjustable to a position in which actuation of the shutter will be prevented.

5. In a camera, a box equipped with a lens and a cockable shutter and with provisions for mounting a film-supply spool and a take-up spool, a pair of rollers between which the film is frictionally gripped as it passes from the supply spool to the take-up spool, means for connecting one of said rollers to the take-up spool so that the take-up spool is rotated from said roller in a direction to feed film, a rock shaft having its ends journaled in the box, a gear having connections with the rock shaft including an arm on said shaft whereby it is rotated on the axis of the rock shaft by rotation of said shaft and having connections to said last-named feed roller whereby the take-up spool is caused to feed film when the rock shaft is turned in one direction, a register mechanism visible from the exterior of the box operably connected to said gear, operative means of connection between the intermediate part of said rock shaft and the shutter whereby the shutter is cocked and released as the rock shaft is turned, an arm rigid with one end of said rock shaft at the exterior of the box adapted to be swung oppositely through a limited arc, and limiting stops on the box exterior between which said arm swings, one of said stops being a pivoted stop movable to a position with respect to the arm which will block release of the shutter.

6. In a camera, the combination of a box equipped with a lens and a shutter and with provisions for mounting a film-supply spool and a take-up spool, the shutter comprising a movable spring-pressed element adapted to be cocked and released, a pair of rollers between which the film is frictionally gripped as it passes from the supply spool to the take-up spool, means for connecting one of said rollers to the take-up spool so that the take-up spool is rotated from said roller in a direction to feed film, a rock shaft having its ends journaled in the box, means operably connecting said rock shaft with the shutter so that the shutter is cocked and released, a gear revoluble about said rock shaft within the box connected to one of said feed rollers to rotate the same, an arm rigid with said rock shaft within the box adapted to rotate said gear in a direction to feed film, a register device visible at the exterior of the box operably connected to said gear, a manipulating arm rigid with the rock shaft at the exterior of the box adapted to be swung in one direction to feed film for the next exposure and cock the shutter and to be swung in the opposite direction to release the cocked shutter for taking the picture, and stop members on the exterior of the box which limit its swinging movement to approximately 120°.

7. In a camera having a box equipped with a lens and film-supporting spools, a cockable shutter, a film-feeding means, an exposure-registering means, an internal operating member operably connected to said shutter and to said film-feeding means and to said registering means, a manipulating arm rigid with said operating member at the exterior surface of the box and swingable in opposite directions in a predetermined arc, said arm being operable by finger push and when traversed in one direction through a distance which remains constant being adapted to feed film and operate said registering means and when traversed in the opposite direction effecting the release of the shutter, and limiting stops on the box exterior between which said arm operates and which control the amplitude of swing of the arm.

8. In a camera having a box equipped with a lens and film-supporting spools, a cockable shutter, a film-feeding means, an internal operating member operably connected to said shutter and to said film-feeding means, a manipulating arm rigid with said operating member at the exterior surface of the box and swingable in opposite directions in a predetermined arc, said arm being operable by finger push and when traversed in one direction being adapted to feed film and when traversed in the opposite direction effecting the release of the shutter, and limiting stops on the box between which said arm operates and which control the amplitude of swing of the arm, the stop toward which the arm moves for shutter release being adjustable so that it can be placed in a position to block release of the shutter.

EDWIN J. DREISBACH.

REFERENCES CITED

The following references are of record in the file of this patent:

UNITED STATES PATENTS

| Number | Name | Date |
|---|---|---|
| 1,917,330 | Riddell | July 11, 1933 |
| 1,965,442 | Wahnish | July 3, 1934 |
| 2,003,691 | Lundberg | June 4, 1935 |
| 2,104,094 | Nerwin | Jan. 4, 1938 |
| 2,111,425 | Goldhammer | Mar. 15, 1938 |
| 2,182,133 | Moomaw | Dec. 5, 1939 |
| 2,246,034 | Elison | June 17, 1941 |
| 2,274,707 | Kende et al. | Mar. 3, 1942 |
| 2,298,574 | Lockhart | Oct. 13, 1942 |
| 2,395,828 | Kallusch | Mar. 5, 1946 |

FOREIGN PATENTS

| Number | Country | Date |
|---|---|---|
| 14,927 | Great Britain | of 1893 |